United States Patent [19]

Patchen

[11] Patent Number: 4,965,524
[45] Date of Patent: Oct. 23, 1990

[54] GLITCH FREE CLOCK SELECT

[75] Inventor: Paul J. Patchen, Arlington, Tex.

[73] Assignee: National Semiconductor Corp., Santa Clara, Calif.

[21] Appl. No.: 393,011

[22] Filed: Aug. 11, 1989

Related U.S. Application Data

[63] Continuation of Ser. No. 204,671, Jun. 9, 1988.

[51] Int. Cl.$^5$ .............. H03K 17/00; H03K 5/13; H03K 1/17; H03K 17/56
[52] U.S. Cl. .............................. 328/72; 328/63; 328/104; 328/154; 307/269; 307/243; 307/480
[58] Field of Search .................. 328/72, 63, 104, 154; 307/269, 241, 242, 243, 219, 480

[56] References Cited

U.S. PATENT DOCUMENTS

| | | | |
|---|---|---|---|
| 4,229,699 | 10/1980 | Frissell | 328/63 |
| 4,291,241 | 9/1981 | Mayama et al. | 307/480 |
| 4,342,927 | 8/1982 | Hull | 307/452 |
| 4,379,241 | 4/1983 | Pumo | 307/481 |
| 4,398,155 | 8/1983 | Atwell, Jr. et al. | 328/73 |
| 4,419,629 | 12/1983 | O'Brien | 328/72 |
| 4,423,383 | 12/1983 | Svendsen | 328/63 |
| 4,535,295 | 8/1985 | Kokuryo | 328/155 |
| 4,560,939 | 12/1985 | DeKarske et al. | 328/72 |
| 4,629,909 | 12/1986 | Cameron | 307/279 |
| 4,651,103 | 3/1987 | Grimes | 328/72 |
| 4,672,299 | 6/1987 | Grimes et al. | 323/217 |
| 4,672,647 | 6/1987 | Yamaguchi et al. | 328/105 |
| 4,719,365 | 1/1988 | Misono | 307/269 |
| 4,757,264 | 7/1988 | Lee et al. | 328/72 |

FOREIGN PATENT DOCUMENTS 0101117  5/1986  Japan .................... 307/269

OTHER PUBLICATIONS

Boinodiria, "Clock Synchronization For Counting Asynchronous Time Intervals", IBM Technical Disclosure Bulletin, vol. 16, No. 7, Dec. 1973, pp. 2087–2089.

Primary Examiner—Stanley D. Miller
Assistant Examiner—Trong Quang Phan
Attorney, Agent, or Firm—Limbach, Limbach & Sutton

[57] ABSTRACT

Clock select circuitry is provided which allows CPU operation at the crystal frequency or one-half the crystal frequency. Frequency selection is accomplished under CPU control and circuitry is added to insure that the a glitch free clock change can be performed on the fly. The glitch free clock select insures that no half T state is less than what a full speed half T state would be. By gating the appropriate phases of the half speed clock and the full speed clock to control the clocking of a flip flop, the point at which the clock selection multiplexer is switched can be controlled. In speeding up the clock, the speed change occurs on the falling edge of the full speed clock provided that the half speed clock is low. When slowing down the clock, the speed change occurs on the rising edge of the half speed clock.

10 Claims, 3 Drawing Sheets

GLITCH FREE CLOCK SELECT

This is a continuation of co-pending application Ser. No. 204,671 filed on 6/9/88.

BACKGROUND OF THE INVENTION

1. Field of the Invention

The present invention relates to electrical circuits and, in particular, to a circuit that utilizes an asynchronous clock select input to control selection between two synchronous clock sources while eliminating spurious glitches on the clock output.

2. Discussion of the Prior Art

The clock supplied to a microprocessor must not exceed the maximum frequency requirement inherent in the microprocessor design. For a system where multiple frequency operation is desirable, it becomes necessary to provide a means for selecting the operating frequency. It is also desirable to be able to switch clock speed quickly without stopping the clock and, certainly, without "glitching" the clock, since this would be detrimental to the operation of the microprocessor.

Conventional clock select systems require stopping the clock altogether, selecting the new frequency, and then starting the clock up again at the new frequency. A system of this type is disclosed in U.S. Pat. No. 4,229,699, titled Multiple Clock Selection System, issued to Frissel on Oct. 21, 1980.

The system described by Frissel is adequate in applications where configuration time is not critical. However, in some applications, it is necessary to change speed "on the fly" to meet the requirements of the application. In both cases, it is essential that the selection process be glitch free, i.e. the transition from one clock frequency to another must be implemented in a manner such that small skews or spikes that could be interpreted as clock signals are avoided.

SUMMARY OF THE INVENTION

A clock select circuit in accordance with the present invention allows CPU operation at either the crystal frequency (1/T) or at one-half the crystal frequency (½T), where T equals one period of the crystal clock. Frequency selection is performed under CPU control. Circuitry is provided to insure that the clock speed can be changed "on the fly" without glitches. The glitch free clock select insures that no half-speed T state on the clock generated by the select circuit to drive the CPU is less than what a full speed half T state would be. By gating the right phases of the half speed clock and of the full speed clock to control the clocking of a flip-flop, the point at which the clock selection multiplexer is switched can be controlled. When speeding up the clock, the speed change occurs on the falling edge of the full speed clock provided that the half speed clock is low. When slowing down the clock, the speed change occurs on the rising edge of the half speed clock. The circuitry provided works at frequencies up to and exceeding 20 MHz.

A better understanding of the features and advantages of the present invention will be obtained by reference to the following detailed description of the invention and accompanying drawings which set forth an illustrative embodiment in which the principles of the invention are utilized.

DETAILED DESCRIPTION OF THE INVENTION

Figure 1:
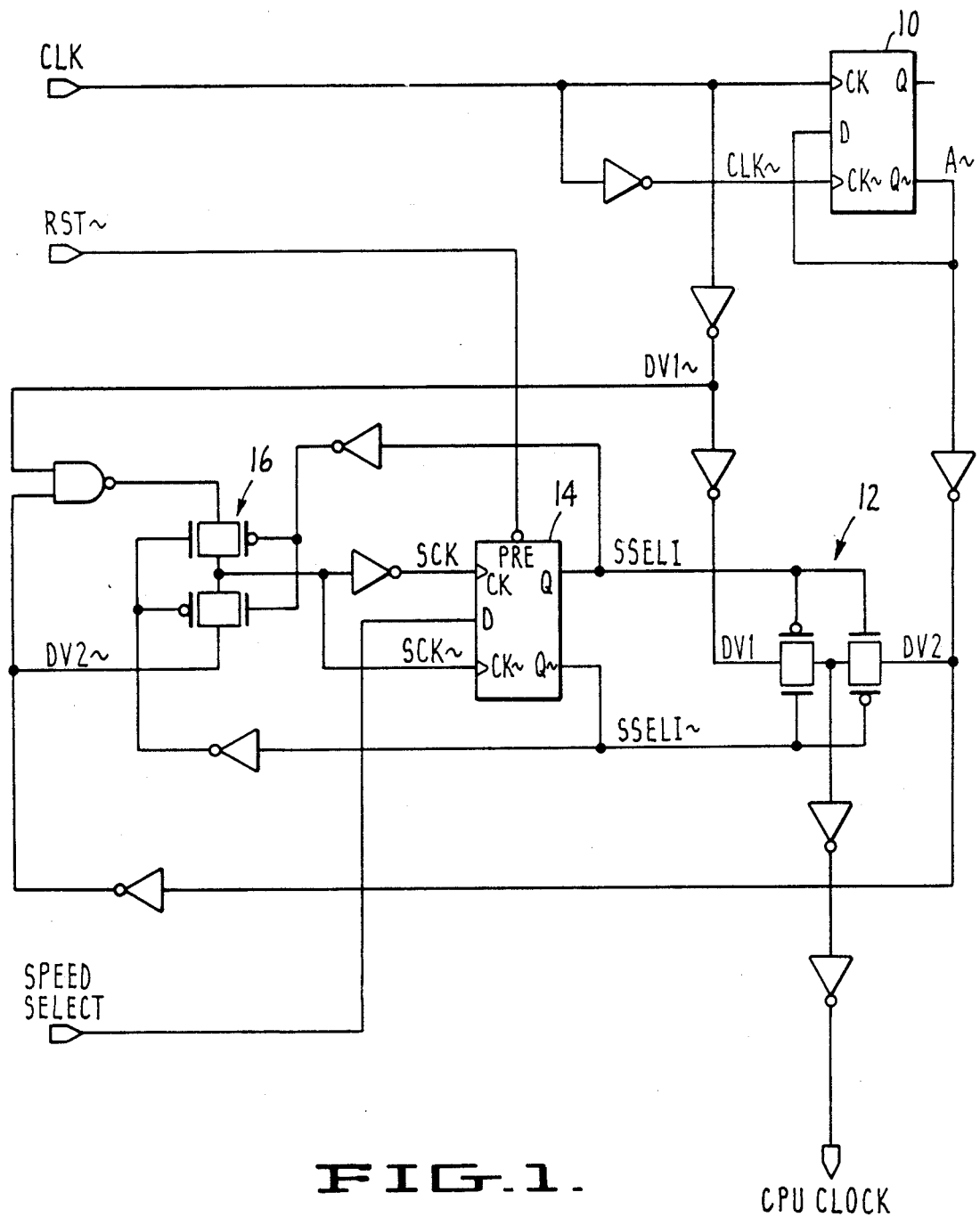
FIG. 1 is a circuit diagram illustrating a glitch free clock select circuit in accordance with the present invention.

Referring to FIG. 1, a glitch free clock select circuit in accordance with the present invention includes a conventional synchronous divider comprising D-flip-flop 10 and its associated delays, for generating a divide-by-two frequency source DV2 in conjunction with a full speed clock source DV1 based on a crystal clock CLK. A two-to-one multiplexer 12 is then utilized for asynchronously selecting between the two synchronous frequency sources DV1 and DV2. Signals SSELI and SSELI' control the steering of the multiplexer 12 such that either input DV1 or input DV2 is selected to form system output CPU_CLOCK. The remaining logic shown in FIG. 1 controls when the SSELI and SSELI' signals change with respect to the DV1 and DV2 inputs to insure that the clock selection changes are glitch free and that the maximum frequency supplied is not exceeded in output CPU_CLOCK. Another function of the remaining logic is to allow frequency selection to be made totally asynchronously to the input clock.

The key to understanding the operation of the clock selection logic lies in the circuitry required for generation of the SCK signal. As shown in FIG. 1, the SCK signal clocks a D type flip-flop 14 the outputs of which, i.e., SSELI and SSELI', control the final clock selection at the multiplexer 12, as described above. The SCK signal is generated from logic combinations of the DV1 and DV2 clock sources and is dependent upon the current mode of operation.

Figure 2:
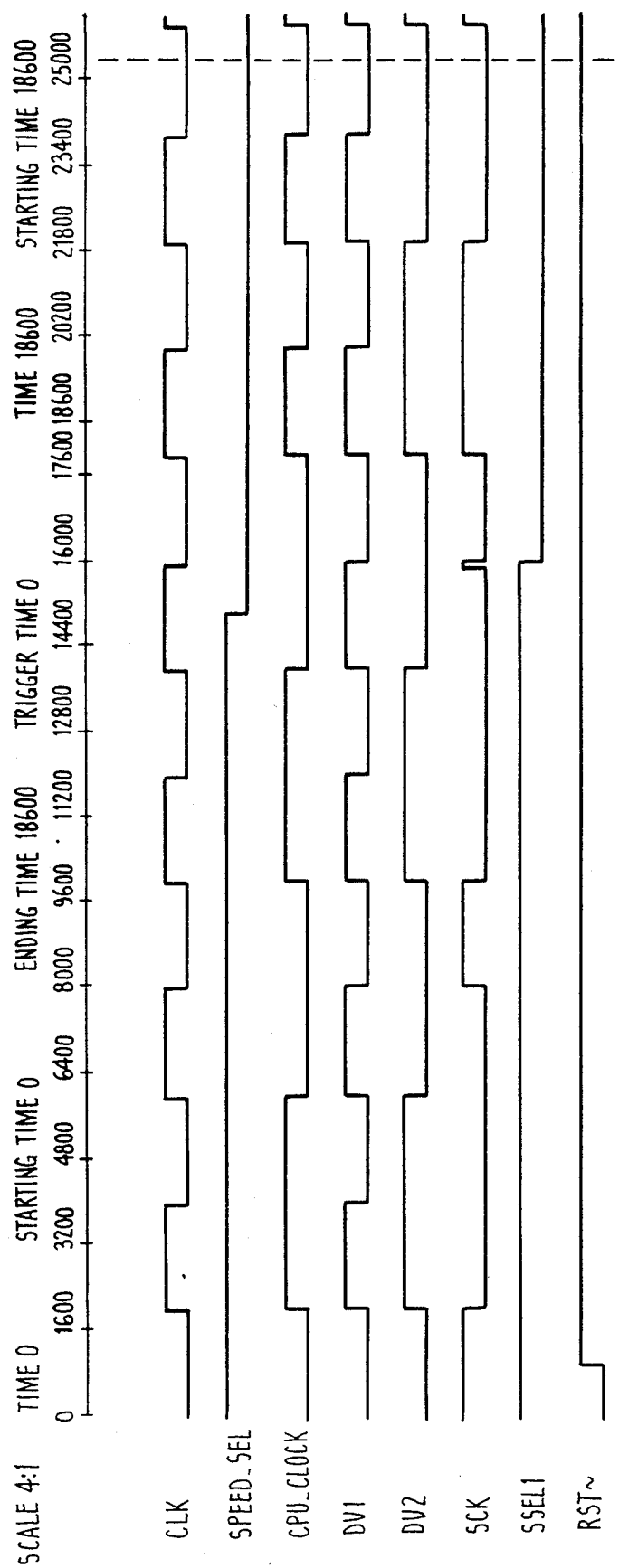
FIG. 2 is a timing diagram illustrating a change in speed selection from low speed to high speed mode of operation for the glitch free clock circuit shown in FIG. 1.
Figure 3:
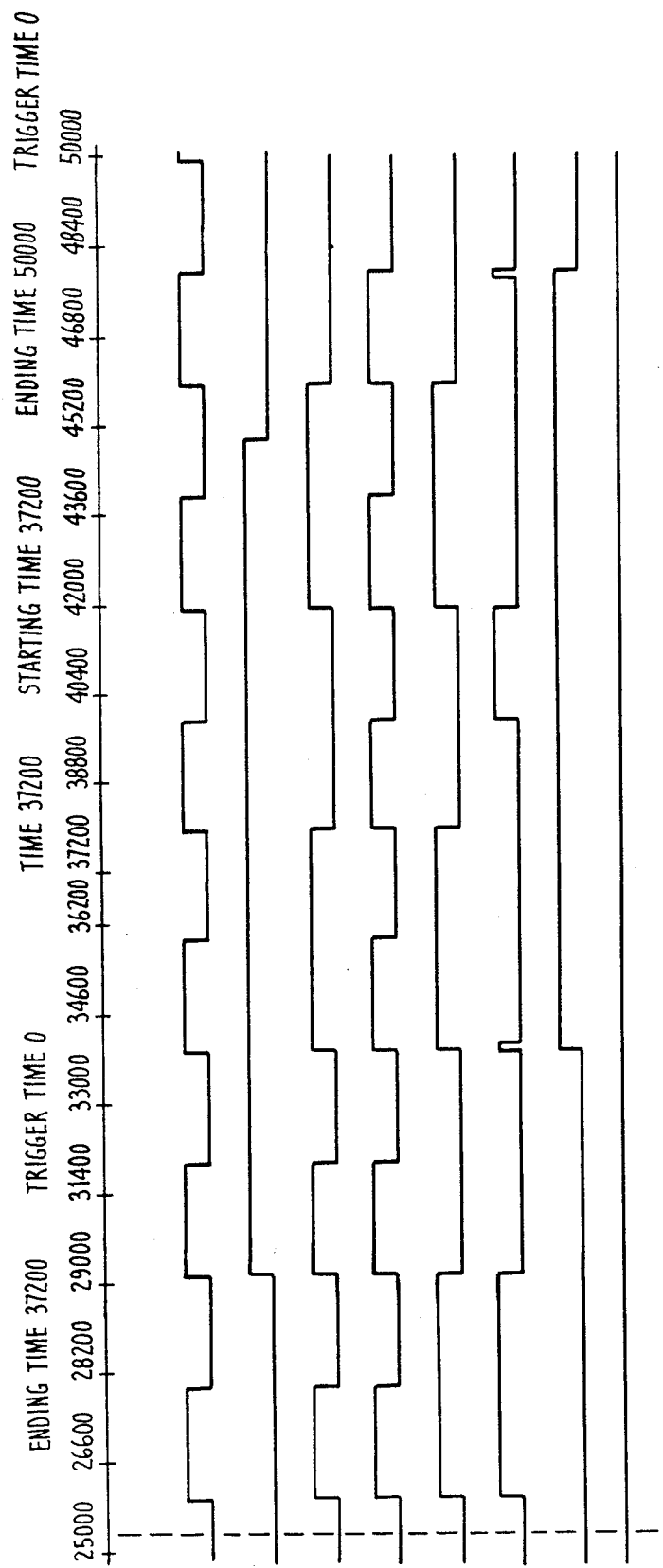
FIG. 3 is a timing diagram illustrating a speed selection change from high speed to low speed mode of operation for the glitch free clock select circuit shown in FIG. 1.

The role of the SCK signal and how it is generated is best described in conjunction with the FIGS. 2 and 3 timing diagrams. When the RST' signal is low, the selection of half-speed clock DV2 is accomplished. As seen in the FIG. 2 timing diagram, the CPU_CLOCK output signal is running in the slowest speed DV2 mode at the start of the simulation. The SPEED_SELECT input is toggled at time point 15,000 in the simulation, as shown in FIG. 2. SSELI is high, which results when SPEED_SELECT is high. The SCK signal at this time can be logically described as SCK=NOT (DV1 or DV2).

The above-described logic combination insures that if SPEED_SELECT goes low, it will result in a frequency change at a point in time when both the DV1 and DV2 clock sources are low. With this constraint, the speed change may shorten the low time of the CPU_CLOCK output at the slow speed, which is of no consequence, since the maximum frequency rate is not exceeded. When SCK goes high, after SPEED_SELECT goes low, the selection of multiplexer 12 is changed and, also, the selection of the generation logic for SCK is changed as well through secondary multiplexor 16. The selection results in the next high time of the CPU_CLOCK output being at the maximum frequency with no glitches in the transition.

With the CPU_CLOCK output at full speed (i.e. with SPEED_SELECT low), the logic equation for SCK is changed to simply SCK=DV2. With this constraint, a frequency change to slow down (i.e., SPEED_SELECT going high) is only allowed to occur on a rising edge of DV2. Since DV2 and DV1 are synchronized, DV1 will be going high along with DV2. Therefore, after SPEED_SELECT goes high, the next rising edge of DV2 results in both SCK and SSELI going high to switch the rate of the CPU_CLOCK output to the slower rate of DV2. As with the speeding up operation, the selection is glitch free and the maximum frequency supplied is not exceeded.

The resulting CPU_CLOCK output can be used to drive a processor the maximum frequency rate of which is that of either DV1 or CLK. The processor speed can then be altered by toggling the SPEED_SELECT signal asynchronously with no detrimental impact on processor operation.

It should be understood that the invention is not intended to be limited by the specifics of the abovedescribed embodiment, but rather defined by the accompanying claims.

What is claimed is:

1. A clock select circuit comprising:
   (a) a synchronous divider responsive to an input clock signal for generating first and second synchronous internal clock signals having first and second frequencies, respectively;
   (b) a two-to-one multiplexor which receives the first and second internal clock signals as inputs and which selects between the first and second internal clock signals to provide the first internal clock signal as a system clock output signal in response to a first select input and to provide the second internal clock signal as the system output clock signal in response to a second select input;
   (c) selection means responsive to the first and second internal clock signals for generating the first and second select inputs such that the multiplexor switches between the first and second internal clock signals on a logic transition that is common to both the first and second internal clock signals.

2. Clock select circuitry as in claim 1 and further including means responsive to the first and second internal clock signals for initiating switching of the multiplexor between the first and second internal clock signals asynchronously to the input clock signal.

3. A clock circuit comprising:
   (a) a synchronous divider responsive to an input clock signal for generating first and second clock signals having first and second frequencies, respectively, the first and second clock signals being synchronous with the input clock signal;
   (b) a multiplexor that receives the first and second clock signals as inputs and switches a multiplexor output signal between the first and second clock signals in response to first and second speed select signals, respectively; and
   (c) steering circuitry for controlling the multiplexor such that switching between the first and second clock signals is implemented at a common transition of the first and second clock signals.

4. A method of selecting a system clock signal from among a plurality of clock signals, the method comprising:
   (a) generating a plurality of synchronous clock signals of differing frequencies in response to an input clock signal;
   (b) selecting one of the plurality of synchronous clock signals as the system clock signal; and
   (c) changing the system clock signal from the selected synchronous clock signal to an alternate synchronous clock signal selected from among the plurality of synchronous clock signals on a common logic transition of the selected synchronous clock signal and the alternate synchronous clock signal.

5. A method as in claim 4 wherein the change from the selected asynchronous clock signal to the alternate synchronous clock signal is initiated asynchronously to the input clock signal.

6. A method ad in claim 4 wherein each of the plurality of synchronous clock signals comprises a series of periodic transitions between a high state and a low state and wherein the change from the selected synchronous clock signal to the alternate synchronous clock signal occurs at a transition from the low state to the high state that is common to the selected synchronous clock signal and the alternate synchronous clock signal.

7. A method of selecting a system clock signal, the method comprising:
   (a) in response to an input clock signal, generating first and second synchronous clock signals having first and second frequencies, respectively;
   (b) switching between the first and second synchronous clock signals to provide the system clock signal in response to first and second speed select signals, respectively; and
   (c) controlling the switching between the first and second synchronous clock signals such that the switching is implemented at a common transition of the first and second synchronous clock signals.

8. A method as in claim 7 wherein the switching is implemented asynchronously to the input clock signal.

9. Clock select circuitry comprising:
   (a) a synchronous divider responsive to an input clock signal for generating a plurality of synchronous internal clock signals having different frequencies;
   (b) a multiplexor that receives the plurality of synchronous internal clock signals as inputs and selectively provides one of the internal clock signals as an output clock signal; and
   (c) selection means for switching the multiplexor means from providing a first internal clock signal as the output clock signal to providing a second internal clock signal as the output clock signal such that the switching from the first internal clock signal to the second internal clock signal occurs on a logic transition common to the first and second internal clock signals.

10. Clock select circuitry comprising:
    (a) a synchronous divider responsive to an input clock signal for generating a plurality of synchronous internal clock signals having different frequencies;
    (b) a multiplexor that receives the plurality of synchronous internal clock signals as inputs and selects one of the synchronous internal clock signals as an output clock signal; and
    (c) selection means for switching the multiplexor such that the synchronous internal clock signal selected by the multiplexor changes from a first internal clock signal to a second internal clock signal and wherein each of the plurality of synchronous internal clock signals comprises a series of periodic logic transitions between a high logic state and a low logic state and wherein the change from the first internal clock signal to the second internal clock signal occurs at a logic transition from the low logic state to the high logic state that is common to both the first internal clock signal and the second internal clock signal.

* * * * *